United States Patent [19]

Tomura et al.

[11] Patent Number: 5,357,570
[45] Date of Patent: Oct. 18, 1994

[54] INTERFACE CONNECTOR MOUNTING STRUCTURE FOR WIRELESS TERMINAL DEVICE

[75] Inventors: Masashi Tomura; Hisamitsu Takagi, both of Kawasaki, Japan

[73] Assignee: Fujitsu Limited, Kawasaki, Japan

[21] Appl. No.: 944,358

[22] Filed: Sep. 14, 1992

[30] Foreign Application Priority Data

Sep. 18, 1991 [JP] Japan ................ 3-237992

[51] Int. Cl.$^5$ ............................................ H04M 1/00
[52] U.S. Cl. ............................................ 379/433; 379/429
[58] Field of Search ............. 379/429, 428, 437, 438, 379/440, 433; 455/89, 90, 300, 301, 347

[56] References Cited

U.S. PATENT DOCUMENTS

| | | | |
|---|---|---|---|
| 3,030,553 | 4/1962 | Comuntzis | 455/300 |
| 3,483,898 | 12/1969 | Tini | 379/438 |
| 4,677,654 | 6/1987 | Lagin et al. | 379/437 |
| 5,048,117 | 9/1991 | Aisaka et al. | 455/90 |

FOREIGN PATENT DOCUMENTS 371708  6/1990  European Pat. Off. ............ 379/433

Primary Examiner—James L. Dwyer
Assistant Examiner—Jack Chiang
Attorney, Agent, or Firm—Armstrong, Westerman, Hattori, McLeland & Naughton

[57] ABSTRACT

An interface connector mounting structure for a wireless terminal device. The mounting structure includes a shielding chassis formed by processing a surface of a resin mold case to have a conductivity, a controller printed circuit board mounted on one of mounting surfaces of the shielding chassis, and a transceiver printed circuit board mounted on the other mounting surface of the shielding chassis. A display and control circuit parts are mounted on the controller printed circuit board. A matching circuit is formed on the transceiver printed circuit board, and a feed connector and transceiver circuit parts are mounted on the transceiver printed circuit board. An interface connector having a coaxial contact is mounted on the controller printed circuit board. A coaxial cord connected at its one end to the coaxial contact is held along a side surface of tile shielding chassis. A coaxial connector connected to the other end of the coaxial cord is removably connected to the feed connector.

2 Claims, 6 Drawing Sheets 5,357,570

INTERFACE CONNECTOR MOUNTING STRUCTURE FOR WIRELESS TERMINAL DEVICE

BACKGROUND OF THE INVENTION

1. Field of the Invention

The present invention relates to an interface connector mounting structure for a wireless terminal device such as a portable telephone.

2. Description of the Related Art

In recent years, a mobile communication has been gradually developed in addition to a conventional intercommunication between fixed points. The mobile communication means a communication between a mobile body such as ship, automobile, or airplane (including a human being) and a fixed point such as home or office, and also means an intercommunication between two mobile bodies. In recent years, a portable telephone or a cordless telephone as a kind of means for carrying out the mobile communication has been extensively developed.

In association with compactness and high functionality of a wireless terminal device such as a portable telephone or a cordless telephone, it is demanded to mount parts in the wireless terminal device with an increasingly high density. Further, in the case of using the wireless terminal device in the mobile body, high functionality and variety of system construction are also demanded. To meet these demands, it is necessary to provide in the wireless terminal device an interface connector having a coaxial contact to be connected to an external equipment and provide a structure enabling wiring of the interface connector to be effected easily and securely.

In the case of mounting a conventional portable telephone on an automobile or the like, the portable telephone is connected through an interface connector to an on-vehicle hand-free unit or the like. However, as the interface connector is not provided with a coaxial portion, an on-vehicle antenna cannot be utilized. Thus, the variety of a portable telephone terminal system is not sufficient. Accordingly, a manner of use of the portable telephone in the mobile body is limited. In general, as the portability with compactness is regarded as of major importance in a portable telephone, an output power of the portable telephone cannot be made so large. Further, a battery pack to be used in the portable telephone is also made compact, and a battery capacity of the battery pack is accordingly small. Accordingly, there occurs a trouble in operation of the portable telephone in a place where a radio wave condition is bad, or a serviceable time of the portable telephone is limited.

SUMMARY OF THE INVENTION

It is therefore an object of the present invention to provide an interface connector mounting structure for a wireless terminal device wherein wiring of a coaxial cord connected to an interface connector can be carried out easily and securely in the wireless terminal device.

In accordance with an aspect of the present invention, there is provided a wireless terminal device comprising a shielding chassis formed by processing a surface of a resin mold case to have a conductivity, said shielding chassis having a first mounting surface and a second mounting surface; a first printed circuit board mounted on said first mounting surface of said shielding chassis, said first printed circuit board mounting thereon a display and control circuit parts; a second printed circuit board mounted on said second mounting surface, said second printed circuit board being formed with a matching circuit, said second printed circuit board mounting thereon a feed connector and transceiver circuit parts; an interface connector mounted on said first printed circuit board, said interface connector having a coaxial contact; a coaxial cord connected at one end thereof to said coaxial contact; a coaxial connector connected to the other end of said coaxial cord, said coaxial connector being removably connected to said feed connector; and holding means for holding said coaxial cord along a side surface of said shielding chassis.

According to the present invention, the interface connector having the coaxial contact and the coaxial cord connected to the interface connector can be mounted easily and securely in a narrow space. A power source in a mobile body can be used through the interface connector, and the wireless terminal device can be connected through the interface connector to an antenna mounted on the mobile body. Accordingly, the variety of a wireless terminal system can be expected, and the operability of a portable telephone or the like can be improved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
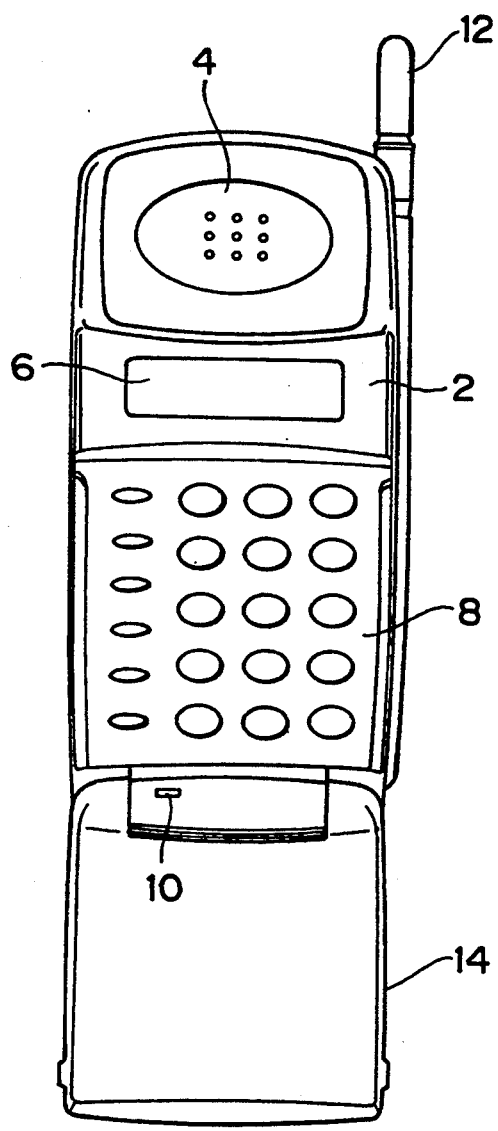
FIG. 1 is a plan view of a portable telephone adopting the interface connector mounting structure of the present invention.
Figure 2:
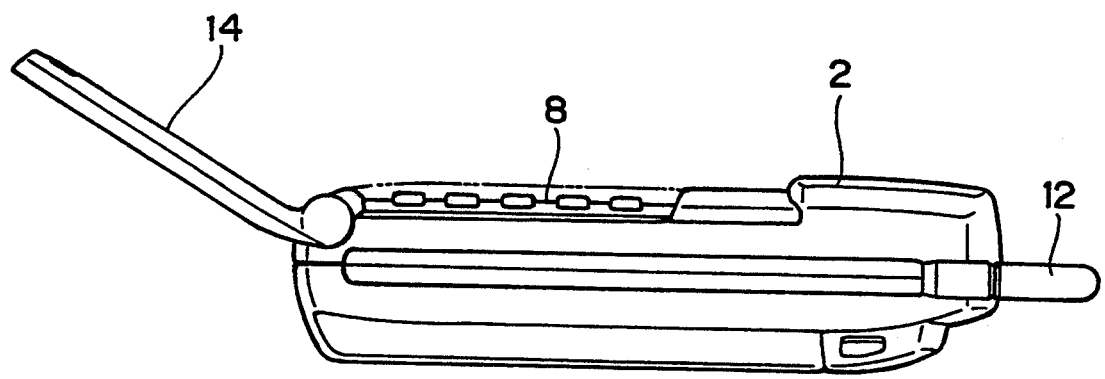
FIG. 2 is a side view of the portable telephone.

Referring now to FIGS. 1 and 2, there are respectively shown a plan view and a side view of a portable telephone adopting the interface connector mounting structure of the present invention. In FIGS. 1 and 2, reference numeral 2 denotes a case of the portable telephone. A receiver section 4 accommodating an earphone therein is provided at an upper end portion of the case 2. A display section 6 such as a liquid crystal display and a switch section 8 having a dialing function or the like are provided at a middle portion of the case 2. A transmitter section 10 accommodating a microphone therein is provided at a left end of a lower end portion of the case 2.

An extendible antenna 12 is mounted on a right side surface of the case 2. A cover 14 is rotatably mounted to the lower end portion of the case 2. The cover 14 functions to cover the switch section 8 when closed and also functions as a voice reflecting and collecting board for the transmitter section 10 when opened.

Figure 3:
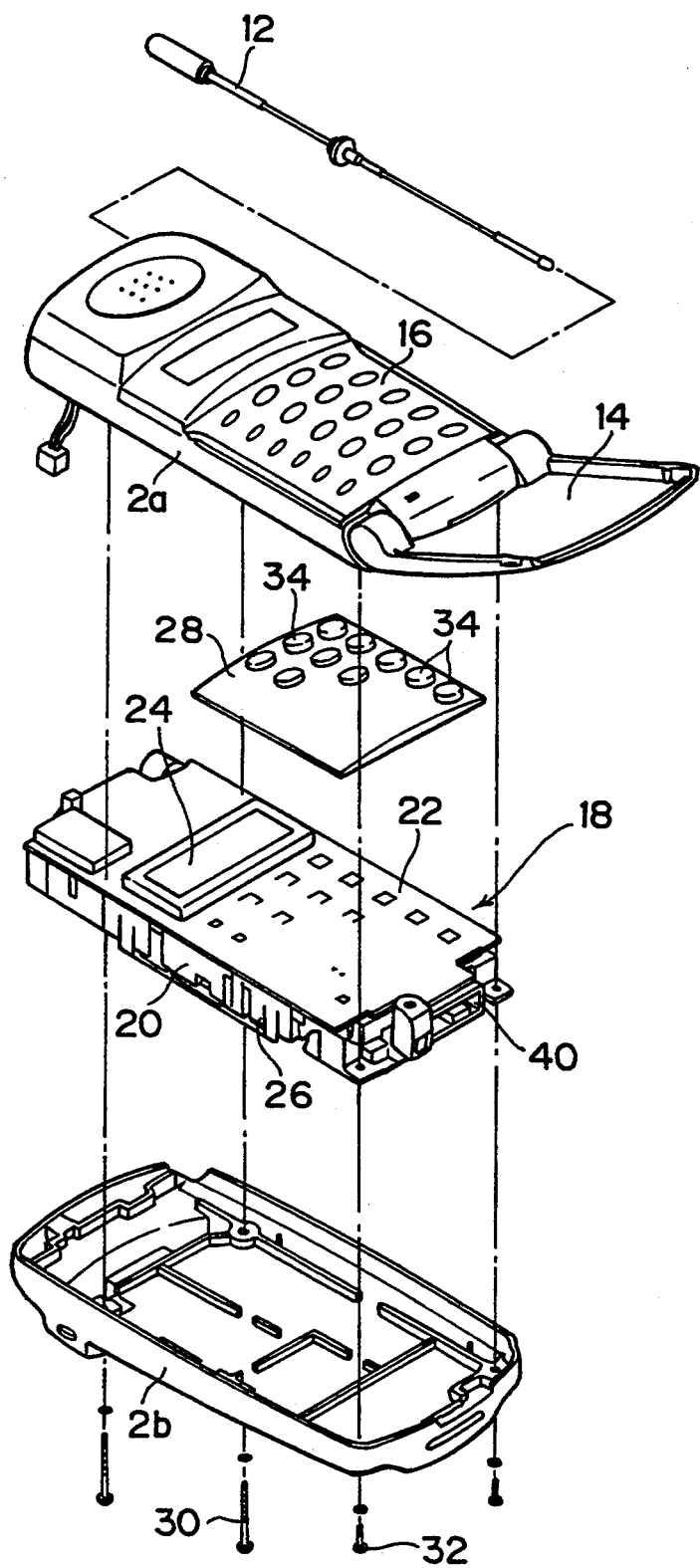
FIG. 3 is an exploded perspective view of the portable telephone.

Referring to FIG. 3, there is shown an exploded perspective view of the portable telephone adopting the interface connector mounting structure of the present invention. The case 2 is comprised of a front case 2a and a rear case 2b. A switch panel 16 is fixed to the front case 2a by ultrasonic welding, for example.

Reference numeral 18 denotes a transceiver and controller integrated module, which is comprised of a shielding chassis 20 processed to have a conductivity by forming a metal deposition film or plating film on a surface of a resin mold case, a controller printed circuit board 22 mounted on a front side of the shielding chassis 20, and a transceiver printed circuit board 26 mounted on a rear side of the shielding chassis 20. A liquid crystal display 24 is mounted on the controller printed circuit board 22. A key top sheet 28 having a plurality of key tops 34 is mounted on the controller printed circuit board 22 of the transceiver and controller integrated module 18, and the front case 2a and the rear case 2b are fastened together by screws 30 and 32, thereby constructing the portable telephone.

Figure 4:
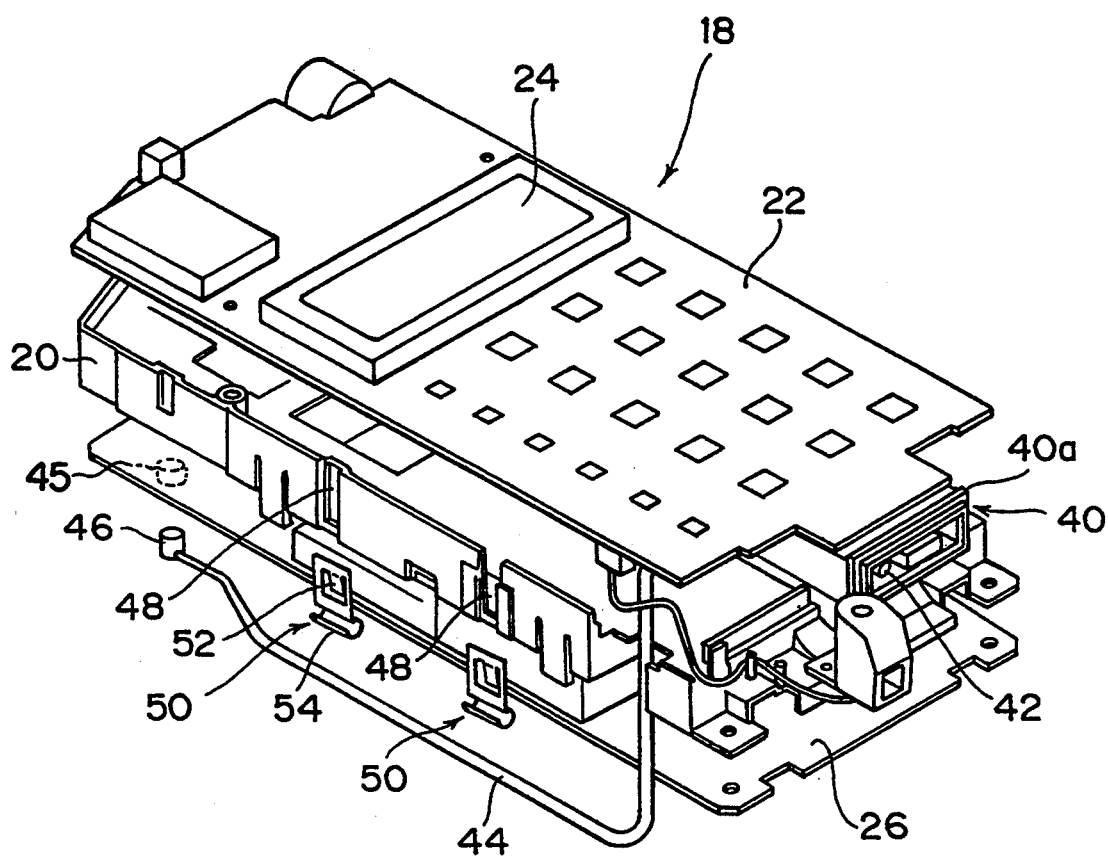
FIG. 4 is an exploded perspective view of the interface connector mounting structure according to a preferred embodiment of the present invention.

Now, the interface connector mounting structure according to a preferred embodiment of the present invention will be described with reference to FIG. 4. Reference numeral 40 designates an interface connector to be connected to an external equipment. The interface connector 40 includes a coaxial contact 42. The interface connector 40 is mounted to the controller printed circuit board 22 in the following procedure. That is, hooks (not shown) of the interface connector 40 are respectively inserted into holes (not shown) of the controller printed circuit board 22, and signal line leads (not shown) of the interface connector 40 are soldered to the controller printed circuit board 22 with a sufficient mounting strength of a connector frame 40a maintained.

The coaxial contact 42 formed of phosphor bronze is engaged with two pawls (not shown) of the connector frame 40a formed of plastic. A coaxial cord 44 is integrally connected at its one end with the coaxial contact 42, and a coaxial connector 46 is provided at the other end of the coaxial cord 44. A matching circuit (not shown) to be connected to the antenna 12 (see FIG. 3) is provided on the transceiver printed circuit board 26. A feed connector 45 to be removably engaged with the coaxial connector 46 is mounted on the transceiver printed circuit board 26 in adjacent relationship to the matching circuit on circuit board 26.

To connect the coaxial cord 44 to the feed connector mounted on the transceiver printed circuit board 26, the coaxial cord 44 is wired from the controller printed circuit board 22 through the shielding chassis 20 serving also as an internal chassis to the transceiver printed circuit board 26 in the following manner. That is, a pair of grooves 48 are formed on a side surface of the shielding chassis 20, and a pair of holders 50 are fixed to the shielding chassis 20 at the respective grooves 48 in such a manner that a pawl 52 of each holder 50 is removably engaged with each groove 48. The pawl 52 is formed by cutting a central portion of each holder 50 and then bending the same. Each holder 50 is integrally formed at its lower end with a curled portion 54. Each holder 50 is formed of metal, for example.

Figure 5A:
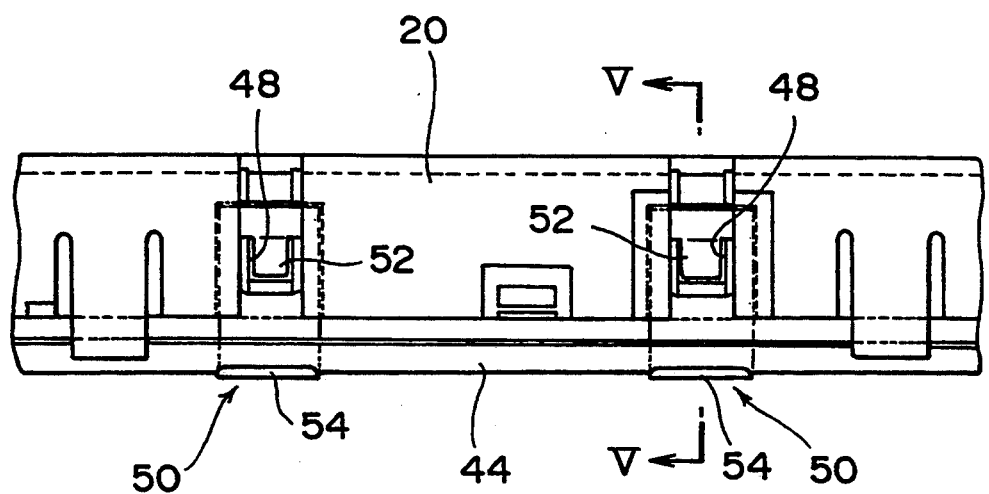
FIG. 5A is an elevational view illustrating means for holding a coaxial cord.
Figure 5B:
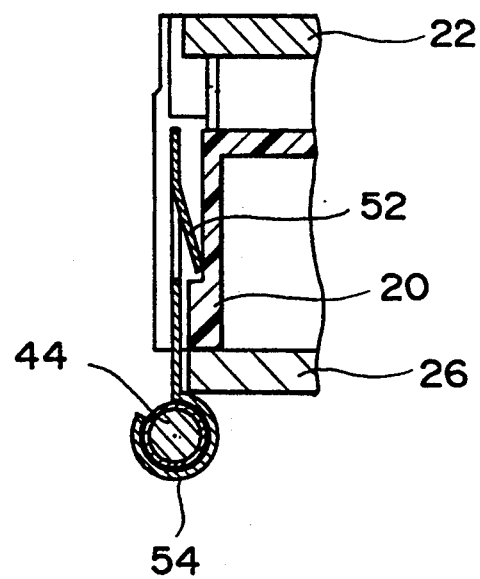
FIG. 5B is a cross section taken along the line V—V in FIG. 5A.

The coaxial cord 44 is inserted in the curled portions 54 of the holders 50 thus mounted on the side surface of the shielding chassis 20. Thus, the coaxial cord 44 is wired along the side surface of the shielding chassis 20. Then, the coaxial connector 46 is engaged with the feed connector mounted on the transceiver printed circuit board 26. The curled portion 54 of each holder 50 has an inner diameter slightly smaller than an outer diameter of the coaxial cord 44, so that the coaxial cord 44 can be press-fitted with each curled portion 54 by utilizing the resiliency of each curled portion 54. In this manner, the coaxial cord 44 is held through the holder 50 to the shielding chassis 20 as shown in FIGS. 5A and 5B.

Figure 6:
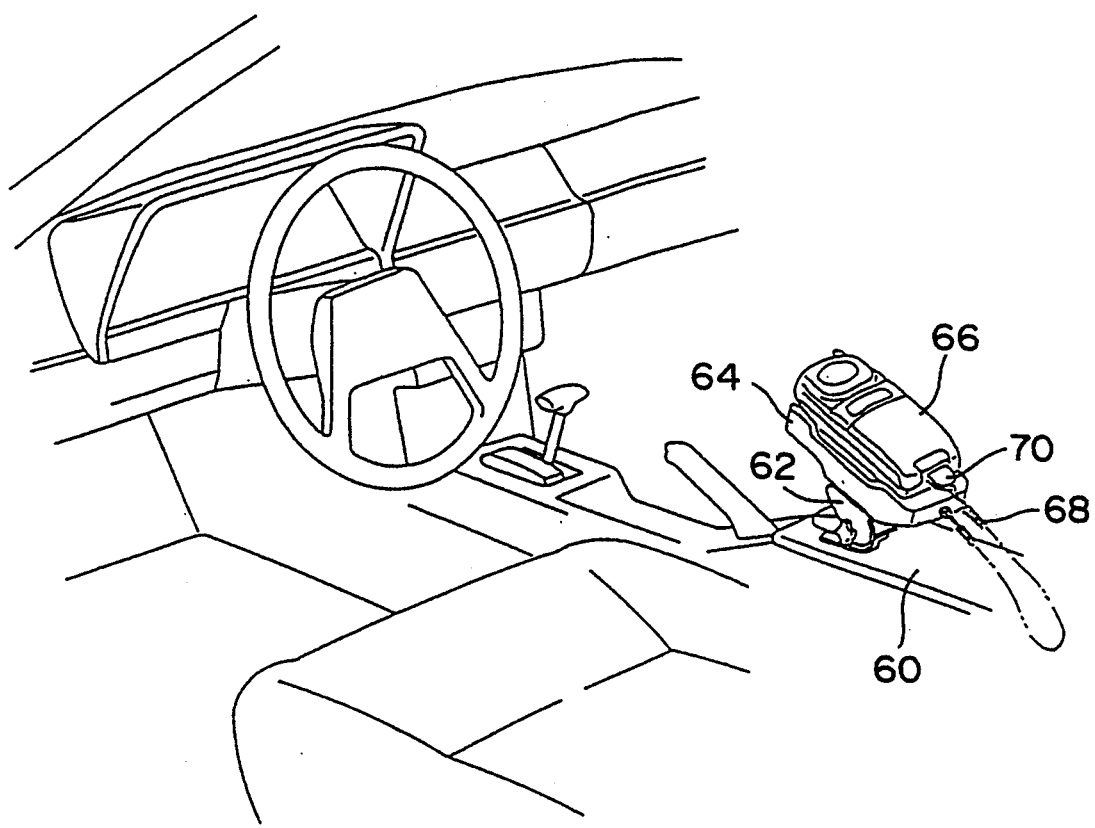
FIG. 6 is a perspective view illustrating a connected condition of an interface connector in the case of mounting the portable telephone on an automobile.

Referring to FIG. 6, there is shown a perspective view illustrating a connected condition of the interface connector 40 in the case of mounting the portable telephone on an automobile. As shown in FIG. 6, a clamshell 62 is fixed to an arm rest 60 in the automobile, and an on-vehicle adapter 64 is mounted on the clamshell 62. A portable telephone 66 including the interface connector 40 is mounted on the on-vehicle adapter 64. A curl cord 68 is connected at its one end to the on-vehicle adapter 64, and a connector 70 is connected to the other end of the curl cord 68. The connector 70 is connected to the interface connector 40 of the portable telephone 66. In this way, the portable telephone 66 can be connected through the on-vehicle adapter 64 to an on-vehicle battery and an on-vehicle antenna.

What is claimed is:

1. A wireless terminal device comprising:
   a casing;
   a shielding chassis housed in said casing, said shielding chassis formed by a surface of a resin molding having a conductive surface and having a first mounting surface and a second mounting surface;
   a first printed circuit board mounted on said first mounting surface of said shielding chassis, said first circuit board having mounted thereon a liquid crystal display, a plurality of key tops and control circuit parts;
   a second printed circuit board mounted on said second mounting surface, said second printed circuit board having mounted thereon a feed connector;
   an interface connector mounted on said first printed circuit board, said interface connector having a coaxial contact for connection to an external antenna;
   a coaxial cord connected at one end thereof to said coaxial contact;
   a coaxial connector connected to the other end of said coaxial cord, said coaxial connector being removably connected to said feed connector; and
   holding means for holding said coaxial cord along a side surface of said shielding chassis.

2. A wireless terminal device according to claim 1, wherein said holding means comprises a groove formed on said surface of said shielding chassis and a holder removably engaged with said groove, said holder having a curled portion for engaging said coaxial cord and a pawl for engaging said groove.

* * * * *